United States Patent [19]

Hansen et al.

[11] Patent Number: 5,493,293

[45] Date of Patent: Feb. 20, 1996

[54] METHOD AND APPARATUS FOR REDUCING FALSE WIND SHEAR ALERTS

[75] Inventors: Rolf Hansen, Bellevue; Susan C. Kim, Bothell; Douglas S. Ormiston, Maple Valley, all of Wash.

[73] Assignee: The Boeing Company, Seattle, Wash.

[21] Appl. No.: 803,659

[22] Filed: Dec. 2, 1991

Related U.S. Application Data

[63] Continuation of Ser. No. 294,463, Jan. 6, 1989, abandoned.

[51] Int. Cl.⁶ .................................................. G08B 23/00
[52] U.S. Cl. ........................... 340/968; 244/181; 340/969; 364/433
[58] Field of Search ..................... 340/968, 963, 340/966, 967, 970, 960; 73/178 T; 244/191, 182, 181; 364/434, 433

[56] References Cited

U.S. PATENT DOCUMENTS

| | | | |
|---|---|---|---|
| 3,327,972 | 6/1967 | Greene | 244/77 |
| 3,569,926 | 3/1971 | Korn et al. | 340/966 |
| 3,618,002 | 11/1971 | Stinson | 340/27 R |
| 3,947,810 | 3/1976 | Bateman et al. | 340/970 |
| 3,988,713 | 10/1976 | Bateman | 340/970 |
| 4,189,777 | 2/1980 | Kuntman | 364/433 |
| 4,229,725 | 10/1980 | Reilly | 340/968 |
| 4,347,572 | 8/1982 | Berwick, Jr. et al. | 364/433 |
| 4,422,147 | 12/1983 | Hanke | 364/440 |
| 4,593,285 | 6/1986 | Miller et al. | 340/968 |
| 4,725,811 | 2/1988 | Muller et al. | 340/963 |
| 4,728,951 | 3/1988 | Johnson et al. | 340/968 |
| 4,797,674 | 1/1989 | Zweifel et al. | 364/434 |
| 4,855,738 | 8/1989 | Greene | 340/968 |

FOREIGN PATENT DOCUMENTS

| | | | |
|---|---|---|---|
| WO87/06043 | 3/1986 | WIPO | |
| WO87/04991 | 8/1987 | WIPO | B64D 45/00 |

OTHER PUBLICATIONS

Bonafe, J. L.; "*Airbus Windshear Warning and Guidance System;*" Williamsburg, Virginia; Oct. 20, 1988.

*Primary Examiner*—Brent A. Swarthout
*Attorney, Agent, or Firm*—Christensen O'Connor Johnson & Kindness

[57] ABSTRACT

A wind shear detection and alert system, compensated for the calibrated airspeed of the aircraft to minimize nuisance wind shear alerts. The wind shear detection and alert system (10) determines a reference airspeed as a function of flap position, with respect to a minimum maneuver airspeed signal (60) provided by a stall warning computer on the aircraft. The reference airspeed is subtracted from a calibrated airspeed signal (76) that has been filtered to remove minor variations in the signal using a Laplace filter (68). The differential airspeed is further filtered by another Laplace filter (78), producing a filtered differential airspeed signal (70), which the system uses to determine a delta threshold (48) to be applied in compensation for the aircraft airspeed to a wind shear alert reference signal. As the filtered differential airspeed increases, the delta threshold signal increases the absolute level of the wind shear alert threshold, reducing the likelihood of unnecessary wind shear alerts.

4 Claims, 4 Drawing Sheets

METHOD AND APPARATUS FOR REDUCING FALSE WIND SHEAR ALERTS

This application is a continuation application based on prior application Ser. No. 07/294,463, filed on Jan. 6, 1989, and now abandoned.

TECHNICAL FIELD

The present invention generally concerns airborne instrumentation and flight warning systems, and particularly pertains to instrumentation and methods for detecting and alerting the crew of an aircraft of a wind shear condition.

BACKGROUND OF THE INVENTION

The term wind shear refers to a meteorological phenomenon in which an isolated moving mass of air has a significant vertical component of motion. Although frequently associated with microbursts or localized rain squalls, winds circulating downwardly in a column may occur without any apparent warning in otherwise relatively calm, clear air. An aircraft flying through a wind shear condition is not subject to any significant danger, so long as its altitude is sufficient; however, if the aircraft is either taking off or on a landing approach, the pilot's response to the unexpected rate-of-change of air movement may cause the aircraft to lose altitude. In extreme wind shear conditions, at low altitude, the actions of the pilot may even result in the aircraft crashing into the ground.

Figure 1:
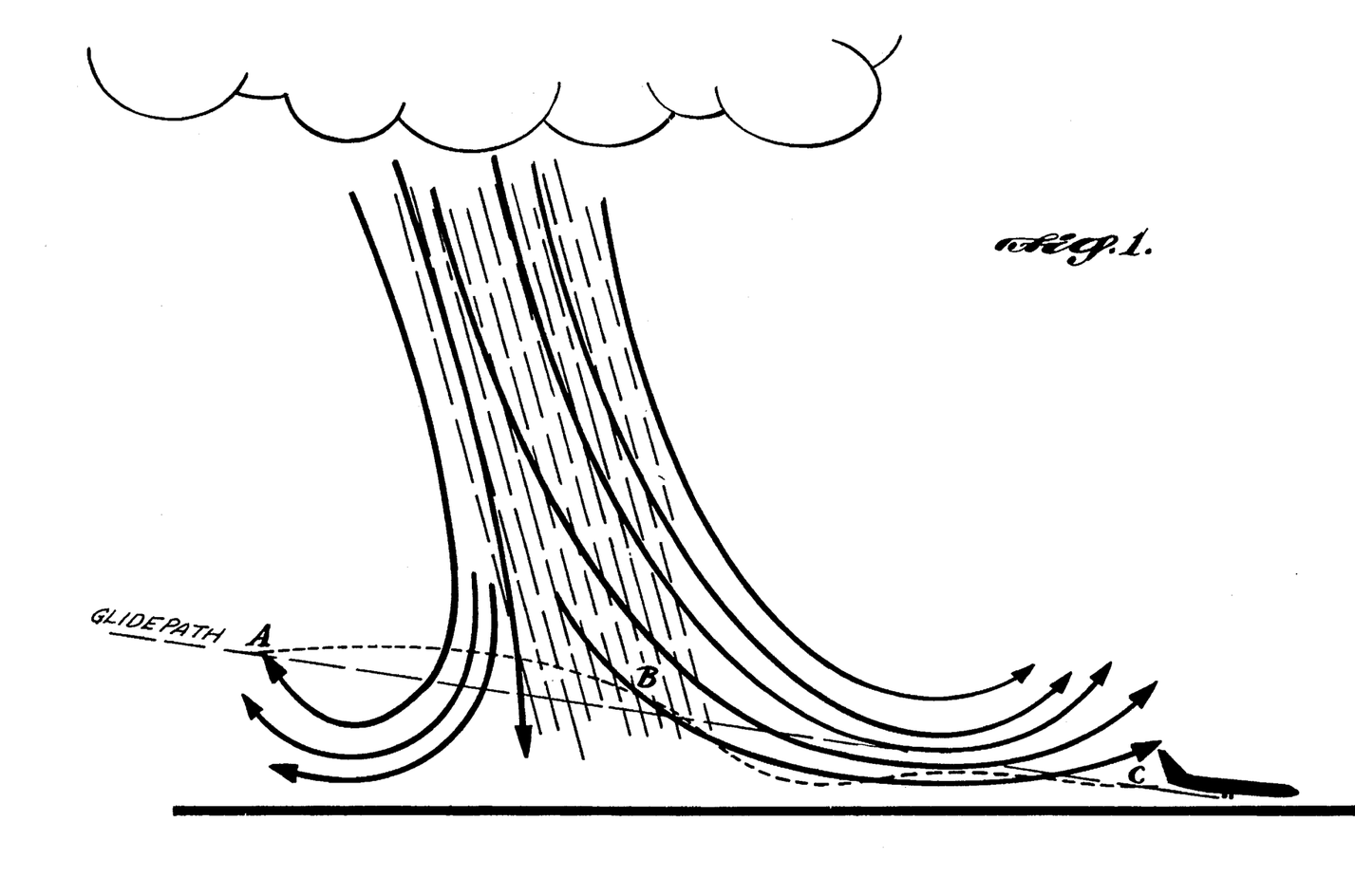
FIG. 1 graphically illustrates a wind shear air mass and its effect on an aircraft traveling over a landing approach flight path.

FIG. 1 graphically illustrates how lateral air movement resulting from the downward movement of an air mass spilling away from the ground creates a dangerous wind shear condition with respect to an aircraft on a landing approach. As the aircraft flies into the downdraft, it is first exposed to a horizontal component of the air mass moving toward the aircraft. Accordingly, the pilot notices an apparent increase in airspeed and increased lift at point A. To remain on the approach glide path, a pilot's instinctive reaction would be to throttle back the engines and push forward on the yoke, bringing the aircraft nose down. However, at point B, the aircraft encounters a horizontal component of the air mass moving in the same direction as the aircraft. This shear condition causes a loss of airspeed and altitude which can have disastrous results unless the pilot reacts quickly to increase the throttle setting and regain a safe altitude, returning onto the glidepath at point C.

Wind shear detectors have been developed to avoid the above scenario by alerting the crew of an aircraft of an incipient wind shear condition. If the pilot is thus warned of the wind shear condition, which causes a loss of total airplane energy, he can avoid his instinctive reaction to reduce throttle in order to maintain airspeed and pitch the airplane down, and instead begin a proper management of the available airplane energy as he is trained to do. Typical prior art wind shear detection and warning systems are disclosed in U.S. Pat. Nos. 3,618,002; 4,593,285; and 4,728,951; and in PCT WO 87/06043.

Each aircraft manufacturer has established a reference airspeed, $V_{REF}$, for their aircraft during an approach for landing, which varies as a function of load and configuration criteria. The reference airspeed is conservatively selected, and is well above the stall airspeed of the aircraft. Furthermore, the recommended landing speed is at or a few knots above $V_{REF}$. The wind shear alerting systems are designed to warn of an incipient wind shear condition based on the aircraft landing at the recommended approach (or takeoff) airspeed with respect to $V_{REF}$. However, on a landing approach, pilots often increase the speed of their aircraft by ten to twenty knots above the reference airspeed to reduce the effect of any wind shear that is present, since the aircraft is easier to control in a wind shear condition at a higher airspeed. At the higher than recommended landing approach airspeeds, pilots have noted and complained of numerous nuisance wind shear alerts, where the effect of wind shear on the aircraft was too small (at the higher initial airspeed of the aircraft) to justify the pilot being alerted.

Once the wind shear alert is sounded, the pilot is instructed to abort the landing and go around. None of the prior art wind shear detection and warning systems provide any mechanism to compensate for the aircraft's airspeed being above the recommended level. Since any warning system that produces significant false alarms may eventually be ignored—with potentially disastrous results, the problem of unnecessary wind shear alerts is more important than may at first appear evident.

SUMMARY OF THE INVENTION

In accordance with the present invention, a system is provided for alerting a pilot of an aircraft of a wind shear condition using means for monitoring a plurality of parameters determinative of this condition, and producing a signal indicative of the magnitude of the wind shear. Means are included for monitoring the aircraft airspeed, and producing a signal indicative of the airspeed. Means are further provided for determining the difference between a reference airspeed and the aircraft airspeed, producing a signal indicative of that difference. The system also includes means operative to determine an alert threshold signal as a function of the signal indicative of the airspeed difference. Finally, means are included for comparing the signal indicative of the wind shear magnitude to the alert threshold signal and are operative to produce a wind shear alert as a function of the relative levels of these signals.

In its preferred form, the system includes means for determining an aircraft flap position, producing a signal indicative of this parameter. The means for determining the alert threshold are connected to receive the signal indicative of the position of the aircraft flap and are operative to determine the alert threshold signal as a function of the flap position. The alert threshold signal is preferably determined as a function of the airspeed difference signal only when the aircraft is in a landing approach.

The aircraft airspeed comprises a calibrated airspeed provided by an air data system on the aircraft. The reference airspeed is preferably derived from a stall warning system on the aircraft and is greater than its stall airspeed. In the preferred form of the invention, the reference speed is determined as a function of flap position.

A method including steps generally equivalent to the functions performed by the elements set forth above is another aspect of the present invention.

DESCRIPTION OF THE PREFERRED EMBODIMENTS

The present invention provides a technique and apparatus for modifying a wind shear alert threshold as a function of a calibrated airspeed for an aircraft. Although it is contemplated that the present invention preferably be used to retrofit existing wind shear detection and alert systems, it also has application for use in wind shear detection and alert systems in which it is an integral part, rather than an add-on or modification.

Figure 2:
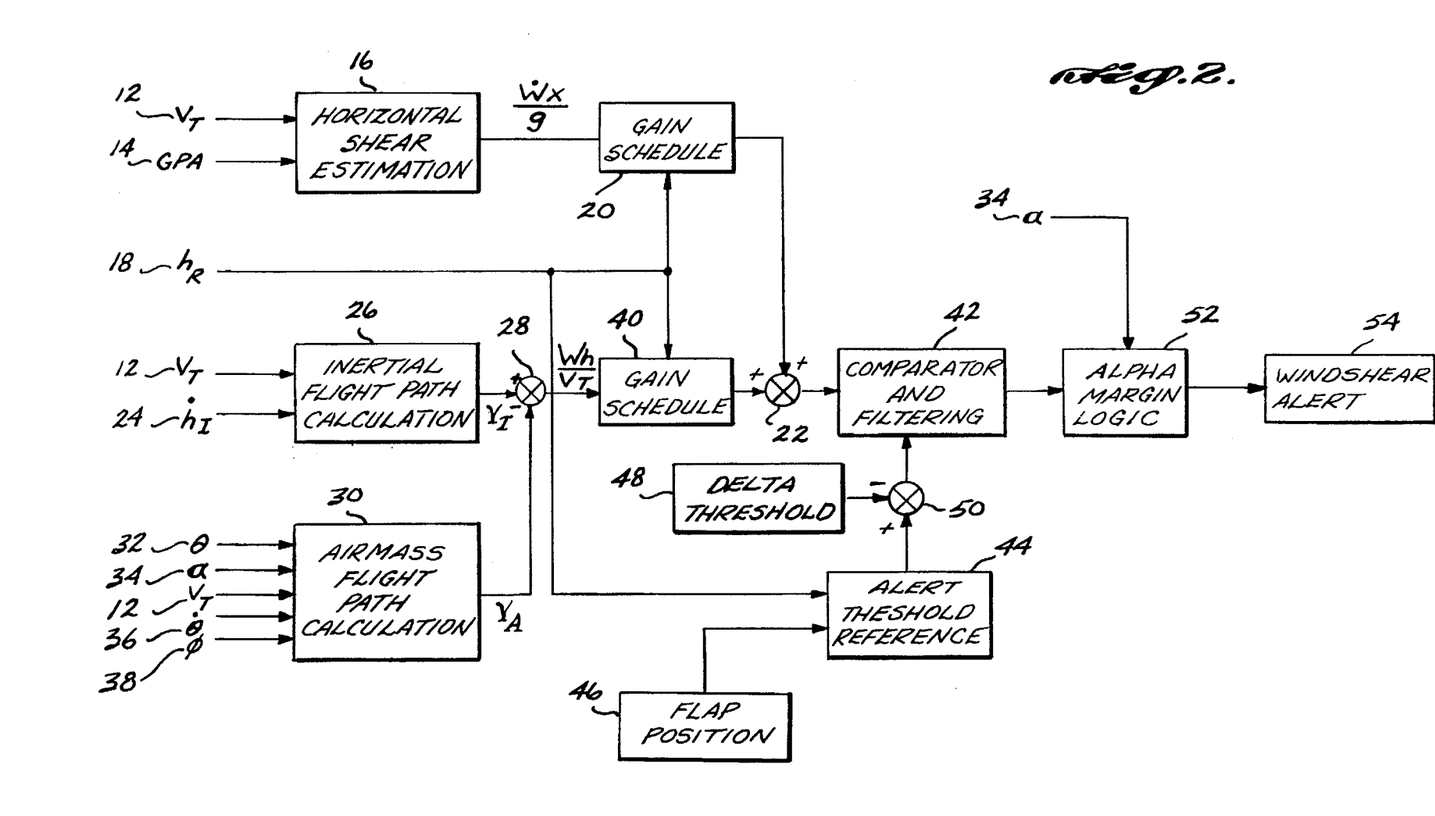
FIG. 2 is a block diagram of a wind shear detection and alert system incorporating the present invention.

With reference to FIG. 2, a wind shear detection and alert system retrofitted with the present invention is depicted in a block diagram, identified generally by reference numeral 10. One of the inputs to wind shear detection and alert system 10 is a signal 12 indicative of true airspeed, $V_T$, produced by an air data system (not shown) that is typically installed on the aircraft. True airspeed is the speed of the aircraft relative to the air through which it is moving; it is corrected for variations in air density due to altitude, ambient air temperature, and static air pressure. An acceleration signal 14 indicative of ground plane inertial acceleration (GPA) is used in connection with the true airspeed to calculate an estimate of a horizontal component of wind shear energy in a block 16. The use of the more readily available flight path acceleration (FPA) signal introduces a false indication of horizontal windshear when the aircraft turns in a steady wind. Use of GPA signal 14 avoids this error and provides a more accurate determination of the horizontal wind shear rate component, $W_x/g$, where $W_x$ is the rate of change in wind velocity in the horizontal plane and g is the acceleration of gravity.

In a block 20, a radio altimeter signal 18, represented by $h_R$ determines a gain coefficient used to scale the value $W_x/g$. The gain schedule in block 20 is actually a look-up table used by wind shear detection and alert system 10 to determine the appropriate gain coefficient as a function of the altitude of the aircraft above ground. The value obtained through scaling $W_x/g$ by the coefficient from block 20 is input to a summation block 22 for addition to a signal produced by an inertial flight path calculation in a block 26.

True airspeed signal 12 and an altimeter rate signal 24, represented by $h_I$, are input to block 26. Altimeter rate signal 24 is supplied by the air data system, based upon changes in barometric pressure, or alternatively, may be supplied from an inertial rate unit (not shown) that produces navigational signals for the aircraft cockpit instrumentation. In block 26, a value is computed for the inertial flight path component of wind shear, represented by $\gamma_I$, which is input to a summation block 28. In summation block 28, a signal for the air mass flight path component of wind shear, represented by $\gamma_A$, is subtracted from the inertial flight path component $\gamma_I$, producing a value for a vertical component of wind velocity $(W_h/V_t)$. The air mass flight path component is determined in a block 30. Block 30 has six input signals, including a pitch signal 32, represented by $\theta$; an angle of attack signal 34, $\alpha$, provided by an alpha vane mounted at the nose of the aircraft fuselage; true airspeed signal 12; a pitch rate signal 36, designated by $\dot{\theta}$; and a roll angle signal 38, represented by $\phi$.

The calculated value for $W_h/V_T$ is scaled by a coefficient determined from a gain schedule or look-up table as a function of radio altimeter signal 18, in a block 40, to produce an input to summation block 22. The output from summation block 22 represents the wind energy acting on the aircraft during a wind shear condition, and is thus indicative of the effect of wind shear on the flight path of the aircraft. The wind energy is a vector that becomes more negative as the magnitude of wind shear increases.

In a block 42, the signal output from summation block 22 is filtered and compared to a wind shear alert threshold reference provided from a block 44. In the preferred embodiment of wind shear detection and alert system 10, a wind shear alert threshold reference for an aircraft on a landing approach is −0.11.

Prior art wind shear detection systems have provided no mechanism to compensate the wind shear alert threshold reference for an increased aircraft airspeed. In such systems, the wind shear alert threshold reference signal would be input directly to comparator and filtering block 42 for comparison to the wind shear signal output from summation block 22. However, in wind shear detection and alert system 10, a delta threshold block 48 is included to compensate the wind shear alert threshold reference signal provided by block 44 for an increased airspeed of the aircraft, i.e., increased with respect to a reference (or recommended) airspeed.

Since the wind shear alert threshold value is typically different for an aircraft on a landing approach than for an aircraft taking off, wind shear alert threshold reference block 44 is provided with an input from radio altimeter signal 18 and a flap position signal 46 to determine whether the aircraft is on approach for landing. The values of the radio altimeter signal and the flap position signal define the flight status of the aircraft and thus determine the appropriate wind shear alert threshold value that should be used.

The compensation for the aircraft airspeed provided in delta threshold block 48 is subtracted from the wind shear alert threshold reference value in a summation block 50 and the resultant sum is input to comparator and filtering block 42 for comparison to the wind shear signal from summation block 22. So long as the wind shear signal output from summation block 22 is greater (less negative) than the compensated wind shear alert threshold reference signal provided from summation block 50, comparator and filtering block 42 produces a null output, indicating that any wind shear condition present is too low in magnitude to justify a wind shear alert. However, as soon as the wind shear signal is less (more negative) than the modified wind shear alert threshold reference signal, the output from comparator and filtering block 42 changes state, producing a wind shear alert signal that is input to an alpha margin logic block 52. The wind shear alert signal is output from alpha margin block to a wind shear alert indicator 54 to provide both an audible and visual alarm in the cockpit that the aircraft is flying into a significant wind shear condition.

Angle of attack signal 34 is input to alpha margin logic block 52, to determine whether the pilot has responded to the wind shear condition. Alpha margin logic block 52 continues to enable the visual alarm on wind shear alert indicator 54 even after the absolute value of the wind shear signal output from summation block 22 ceases to exceed the modified wind shear alert threshold reference signal input from summation block 50, so long as the angle of attack signal indicates a nose-up condition for the aircraft relative to airflow over the nose. The purpose of alpha margin logic block 52 is to prevent the pilot from prematurely pitching the airplane down to restore airspeed which could be hazardous close to the ground.

Wind shear detection and alert system 10 is typically and preferably implemented in a microcomputer; however, it can also be implemented using separate analog components, as will be apparent to the routineer in the art. The equations used to compute the values for the estimated horizontal component of wind shear, and the inertial flight path and the air mass flight path components are well known and need not be included in this disclosure to understand the present invention. However, compensation for the aircraft airspeed in order to minimize nuisance wind shear alerts has not been done in the prior art, and is therefore disclosed in further detail, as follows.

Figure 3:
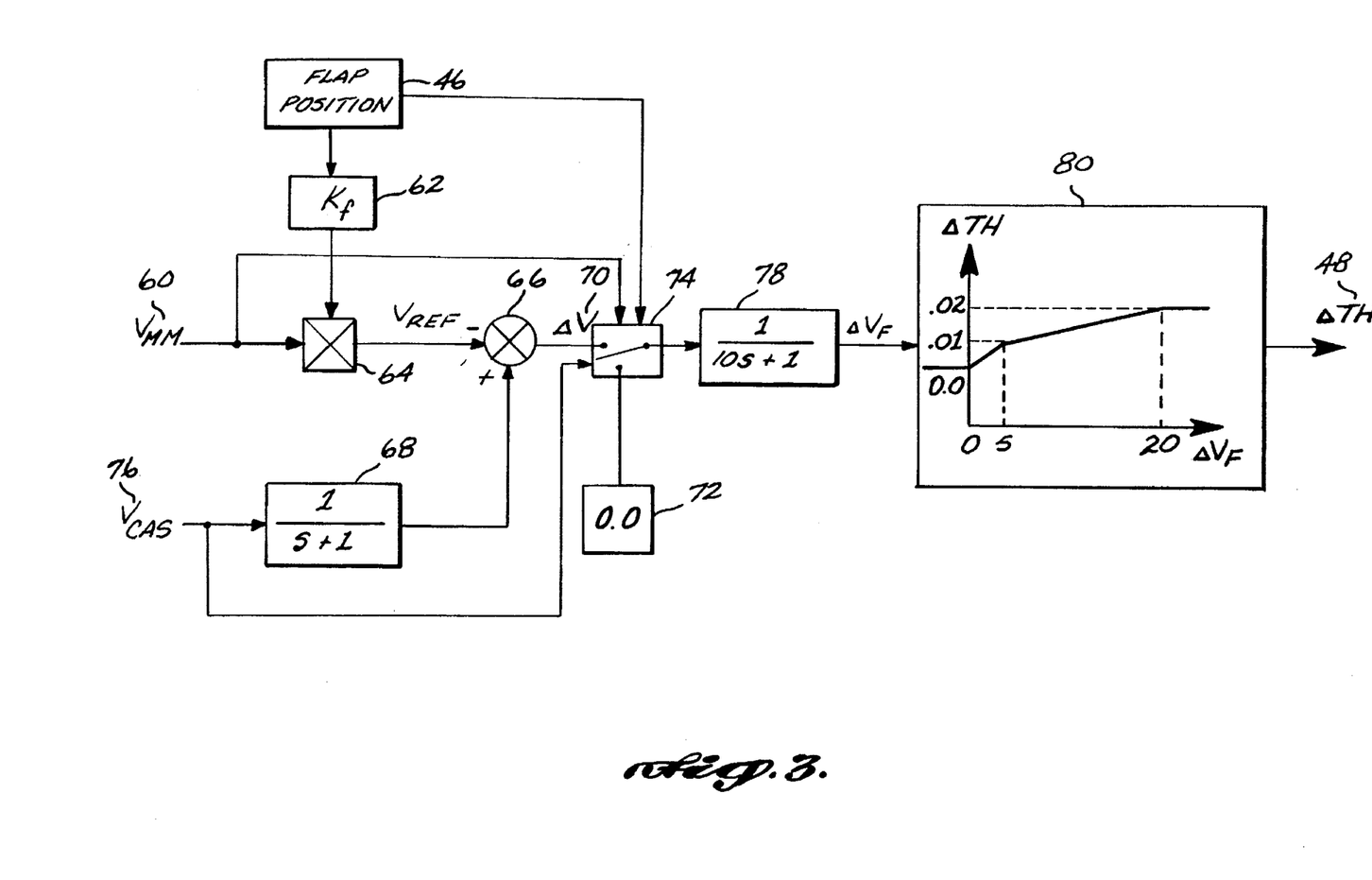
FIG. 3 is a block diagram of a first embodiment for determining a wind shear alert threshold compensation, $\Delta TH$, that is used for determining a wind shear alert.

Referring now to FIG. 3, a first preferred embodiment for the system used to determine the delta threshold compensation for aircraft airspeed is disclosed in a block diagram. In the first preferred embodiment, a stall warning computer is a source for the estimated reference airspeed. A minimum maneuver airspeed signal 60, represented by $V_{MM}$, is provided by the stall warning computer (not shown) that is normally installed on the aircraft and is input to a multiplier block 64. Minimum maneuver airspeed 60 is multiplied by a coefficient, $K_f$, in multiplier block 64, producing a reference airspeed, $V_{REF}$. The coefficient, $K_f$, provided from a block 62, is determined as a function of flap position signal 46. In the preferred embodiment, $K_f$ has a value ranging around 1.08; the value for $V_{REF}$ is thus slightly greater than minimum maneuver speed 60, and varies a few percent as a function of flap position.

The $V_{REF}$ signal output from multiplier block 64 is input to a summation block 66 in which it is subtracted from a calibrated airspeed signal 76, identified in the figure by $V_{CAS}$. Calibrated airspeed equals true airspeed only at sea level, under standard day conditions. The calibrated airspeed signal is input to a Laplace filter block 68 in which a transform $1/(S+1)$ (where S is the Laplacian operator) is applied to smooth or filter minor variations in the signal. The filtered value for $V_{CAS}$ is input to summation block 66 where the value for $V_{REF}$ is subtracted from it, producing a differential airspeed signal 70, represented by $\Delta V$.

The differential airspeed signal is input to a decision block 74, which determines whether the aircraft is on a landing approach and whether valid speed signals exist. To determine this condition, block 74 has inputs for flap position signal 46, minimum maneuver airspeed signal 60, and calibrated airspeed signal 76. Based upon these three signals, the system determines whether the aircraft is in a landing approach and whether $V_{MM}$ and $V_{CAS}$ contain valid information, and if so, supplies differential airspeed signal 70 as an input to a Laplace filter block 78; otherwise, a zero differential airspeed value is input from a block 72. Laplace filter block 78 applies a transfer function $1/(10S+1)$ to the differential airspeed signal, providing a 10-second first order lag function for filtering and smoothing the signal. The output of Laplace filter block 78, a filtered differential airspeed represented by $\Delta V_F$, is input to a block 80, wherein a schedule or look-up table is used to determine delta threshold block 48 as a function of the filtered differential airspeed. As shown in block 80, the value of the delta threshold signal is equal to zero for a filtered differential airspeed of zero knots, increases to a value of 0.01 when the filtered differential airspeed is equal to 5 knots, and attains a maximum value of 0.02 when the filtered differential airspeed is equal to 20 knots.

It should thus be apparent that no delta threshold signal compensation is wanted when the pilot is flying the aircraft at the $V_{REF}$ airspeed. Since a signal indicative of the reference airspeed is not directly available, the first embodiment of the present invention uses minimum maneuver airspeed signal 60 provided by the stall warning computer to determine the reference. As the pilot flies the aircraft faster than the recommended airspeed during an approach for landing, the threshold for determining a wind shear alert becomes more negative, reducing the likelihood of nuisance wind shear alerts, i.e., wind shear alerts that are not justified in view of the increased airspeed of the aircraft.

Figure 4:
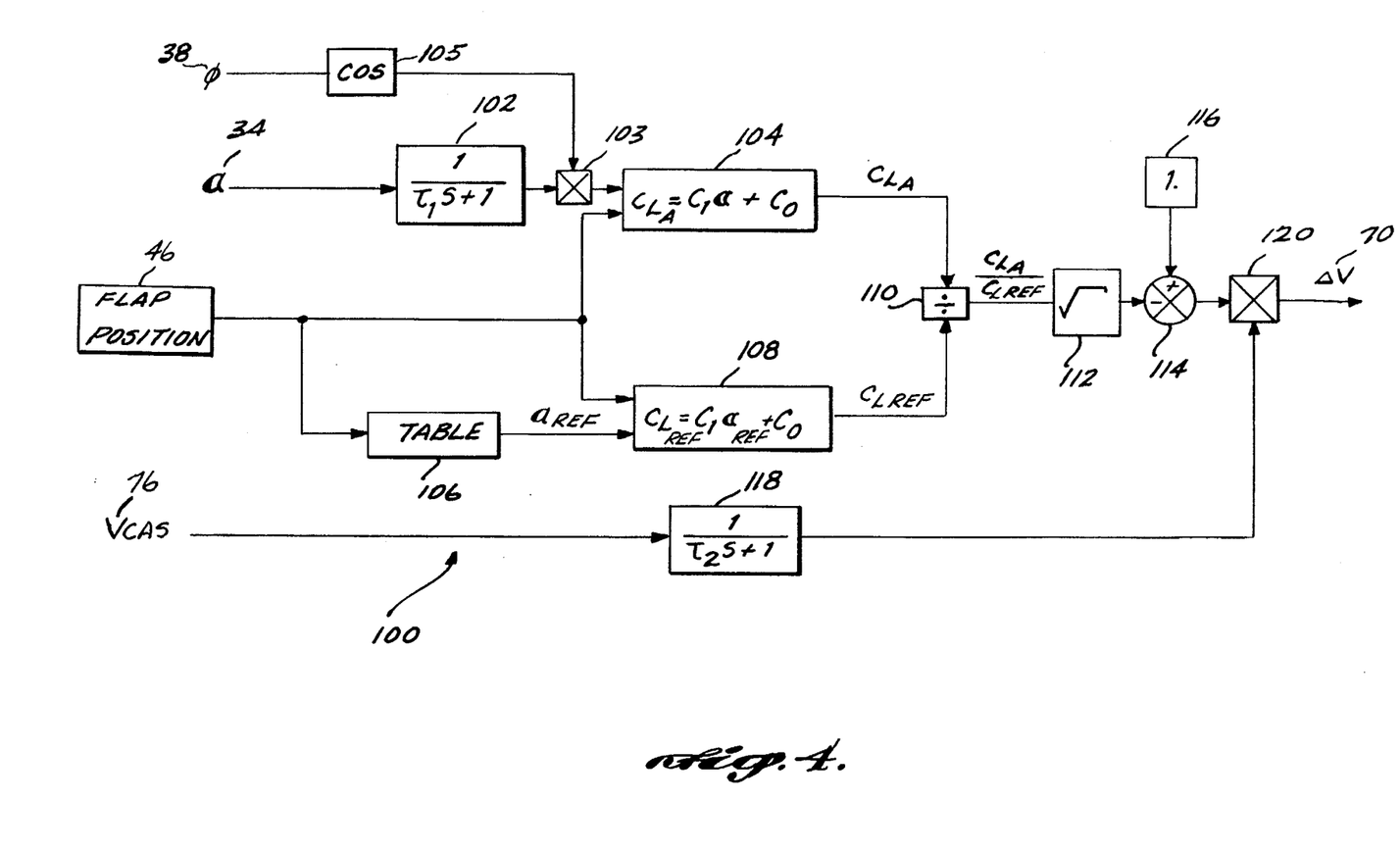
FIG. 4 is a block diagram of a second embodiment for determining a differential airspeed used to compensate a wind shear alert threshold.

In the event that a value for minimum maneuver airspeed signal 60 is not available from the stall warning computer on an aircraft, differential airspeed signal 70 can be determined by a second preferred embodiment of the present invention, shown in the block diagram of FIG. 4 at reference numeral 100. Angle of attack signal 34, $\alpha$, is input to a Laplace filter block 102, which applies the transform function $1/(\tau_1 S+1)$, where $\tau_1$ preferably equals 10. The output of Laplace filter block 102 (a first order, 10-second lag filter) is input to a multiplier block 103. A multiplicand for multiplier block 103 is derived from roll angle signal 38 by taking the cosine of said angle in block 105 so as to compensate for the load factor increase in turns. The output of block 103 is input to a block 104 for calculation of a value $C_{LA}$, as a function of the angle of attack signal, $\alpha$, and of coefficients $C_1$ and $C_0$, which are determined as a function of flap position signal 46. Flap position signal 46 is also input to a look-up table block 106 for determination of an angle of attack reference signal, represented in FIG. 4 by $\alpha_{REF}$. In a block 108, the flap position signal 46 and the angle of attack reference signal are used to determine a value $C_{LREF}$ as a function of the two coefficients $C_1$ and $C_0$.

In a division block 110, the value for $C_{LA}$ is divided by the value for $C_{LREF}$, and the quotient is input to a square root block 112. The square root of the quotient is input to a summation block 114, where it is subtracted from an integer value input from a block 116, producing a signal input to a multiplier block 120. A multiplicand for multiplier block 120 is derived from the calibrated airspeed signal 76, filtered by Laplacian transform $1/(\tau_2 S+1)$ in a Laplace filter block 118. In the preferred embodiment, $\tau_2$ is equal to 1. The Laplacian transform filters and smooths short-term variations in the calibrated airspeed signal, producing an input to multiplier block 120 for multiplication by the output signal from summation block 114, providing a product equal to the differential airspeed signal 70, indicated as noted above, by $\Delta V$.

The value for differential airspeed signal 70 determined as indicated in FIG. 4, is thus a function of angle of attack signal 34, flap position signal 46, and calibrated airspeed signal 76. Instead of subtracting the calibrated airspeed from a reference value to compute $\Delta V$ as in the first embodiment, the angle of attack and flap position are used to determine a multiplier for transforming the calibrated airspeed signal 76 to differential airspeed signal 70. The table in block 106 accesses values for the $\alpha_{REF}$, which represents the angle of attack at $V_{REF}$ as a function of the flap position signal.

The relationship between the determination of differential airspeed signal 70 in the first embodiment and the approach used in second embodiment 100 should be apparent from equations (1) through (5):

First embodiment:

$$V_{MM}=1.14\ V_{CAS}[C_{LA}/(\eta * C_{LS})]^{1/2} \qquad (1)$$

$$V_{REF}=K_f * V_{MM} \qquad (2)$$

$$\Delta V = V_{CAS} - V_{REF} \qquad (3)$$

Second embodiment:

$$V_{REF} = V_{CAS}[C_{LA}/(\eta * C_{LREF})]^{1/2} \quad (4)$$

$$\Delta V = V_{CAS} - V_{REF} = V_{CAS}\{1 - [C_{LA}/(\eta * C_{LREF})]^{1/2}\} \quad (5)$$

where $\eta$ = normal load factor;
$C_{LA}$ = actual lift coefficient at current airspeed, $V_{CAS}$;
$C_{LS}$ = lift coefficient at stick shaker airspeed; and
$C_{LREF}$ = lift coefficient at reference airspeed, $V_{REF}$.

Since lift coefficient is a function of flap position and angle of attack, it should be evident that second embodiment 100 determines differential airspeed signal 70 using analogous, although different parameters, from those used in the first embodiment.

The calculations implemented in second embodiment 100 to determine differential airspeed 70 are preferably also implemented by the microcomputer used to determine the wind shear alert, as noted above in respect to FIG. 2. These computations can, of course, also be carried out in a circuit comprising separate analog components, as is well known to those of ordinary skill in the art.

While the present invention has been disclosed with respect to its preferred embodiments and modifications thereto, further modifications will be apparent to those of ordinary skill in the art, within the scope of the claims that follow below. Accordingly, it is not intended that the scope of the invention be in any way limited to the details of the disclosed preferred embodiments, but instead that it be entirely determined by reference to the claims.

The embodiments of the invention in which an exclusive property or privilege is claimed are defined as follows:

1. A system for alerting a pilot of an aircraft of a wind shear condition, comprising:

(a) means for monitoring a plurality of parameters determinative of the wind shear condition, and producing a signal indicative of a wind shear magnitude;

(b) means for monitoring the airspeed of the aircraft and producing a signal indicative of the aircraft airspeed;

(c) means for determining the difference between a reference airspeed and the aircrafts airspeed, and producing a signal indicative of the difference, wherein the difference between the reference airspeed and the aircraft airspeed is determined in accordance with the formula:

$$\text{difference} = V_{CAS} - V_{REF}$$

where:

$$V_{REF} = K_{f} * V_{MM}$$

$$V_{MM} = 1.14\ V_{CAS}[C_{LA}/(\eta * C_{LS})]^{1/2}; \text{ and}$$

where:

$\eta$ = a normal load factor;
    $C_{LA}$ = an actual lift coefficient at current airspeed $V_{CAS}$; and
    $C_{LS}$ = a lift coefficient at stick shaker airspeed;

(d) means for determining an aircraft flap position and for producing a signal indicative of the aircraft flap position;

(e) means for determining an alert threshold signal as a function of the signal indicative of airspeed difference and the signal indicative of aircraft flap position and independent of the signal indicative of wind shear magnitude, so that the alert threshold signal is modified to compensate for changes in lift of the aircraft when its speed differs from the reference airspeed and is not affected by the wind shear magnitude, even if the wind shear magnitude changes and so that the alert threshold signal is modified to account for whether the aircraft is on a take off or landing approach; and (f) means for comparing the signal indicative of the wind shear magnitude to the alert threshold signal, and for producing a wind shear alert if a predetermined one of said alert threshold signal and said signal indicative of wind shear magnitude is greater than the other of said signals, whereby when the alert threshold signal is modified as function of the signal indicative of airspeed difference and the signal indicative of aircraft flap position unjustified wind shear alerts are generally avoided, without any adverse impact on aircraft safety during the wind shear condition.

2. A method of alerting a pilot of an aircraft of a wind shear condition, comprising:

(a) monitoring a plurality of parameters determinative of a wind shear condition, and producing a signal indicative of a wind shear magnitude;

(b) monitoring the airspeed of the aircraft and producing a signal indicative of the airspeed;

(c) determining the difference between a reference airspeed and the aircraft airspeed, and producing a signal indicative of the difference, wherein the difference between the reference airspeed and the aircraft airspeed is determined by the formula:

$$\text{difference} = V_{CAS} - V_{REF}$$

where:

$$V_{REF} = K_{f} * V_{MM}$$

$$V_{MM} = 1.14\ V_{CAS}[C_{LA}/(\eta * C_{LS})]^{1/2}; \text{ and}$$

where:

$\eta$ = a normal load factor;
    $C_{LA}$ = an actual lift coefficient at current airspeed $V_{CAS}$; and
    $C_{LS}$ = a lift coefficient at stick shaker airspeed;

(d) determining an aircraft flap position and producing a signal indicative thereof;

(e) determining an alert threshold as a function of the signal indicative of airspeed difference and the signal indicative of aircraft flap position and independent of the wind shear magnitude so that the alert threshold is modified to compensate for changes in lift of the aircraft when its speed differs from the reference airspeed and is not affected by the wind shear magnitude and so that the alert threshold signal is modified to account for whether the aircraft is on a take off or a landing approach; and (f) comparing the signal indicative of the wind shear magnitude to the alert threshold signal, and producing a wind shear alert if a predetermined one of said alert threshold signal and said signal indicative of wind shear magnitude is greater than the other of said signals, whereby when the alert threshold signal is modified as a function of the signal indicative of airspeed difference and the signal indicative of aircraft flap position, unjustified wind shear alerts are generally avoided, without an adverse impact on aircraft safety during the wind shear condition.

3. A system for alerting a pilot of an aircraft of a wind shear condition, comprising:

(a) means for monitoring a plurality of parameters determinative of the wind shear condition, and producing a signal indicative of a wind shear magnitude;

(b) means for monitoring the airspeed of the aircraft and producing a signal indicative of the aircraft airspeed;

(c) means for determining the difference between a reference airspeed and the aircraft's airspeed, and producing a signal indicative of the difference, wherein the difference between the reference airspeed and the aircraft airspeed is determined in accordance with the formula:

$$\text{difference} = V_{CAS} - V_{REF}$$

where:

$$V_{REF} = V_{CAS}[C_{LA}/(\eta + C_{LREF})]^{1/2}; \text{ and}$$

where:

$\eta$ = a normal load factor;

$C_{LA}$ = an actual lift coefficient at current airspeed $V_{CAS}$; and $C_{LREF}$ = a lift coefficient at reference airspeed, $V_{REF}$; means for determining an aircraft flap position and for producing a signal indicative of the aircraft flap position;

(d) means for determining an alert threshold signal as a function of the signal indicative of airspeed difference and the signal indicative of the aircraft flap position and independent of the signal indicative of wind shear magnitude, so that the alert threshold signal is modified to compensate for changes in lift of the aircraft when its speed differs from the reference airspeed and is not affected by the wind shear magnitude, even if the wind shear magnitude changes; and (e) means for comparing the signal indicative of the wind shear magnitude to the alert threshold signal, and for producing a wind shear alert if a predetermined one of said alert threshold signal and said signal indicative of wind shear magnitude is greater than the other of said signals, whereby when the alert threshold signal is modified as function of the signal indicative of airspeed difference and the signal indicative of aircraft flap position, unjustified wind shear alerts are generally avoided, without any adverse impact on aircraft safety during the wind shear condition.

4. A method of alerting a pilot of an aircraft of a wind shear condition, comprising:

(a) monitoring a plurality of parameters determinative of a wind shear condition, and producing a signal indicative of a wind shear magnitude;

(b) monitoring the airspeed of the aircraft and producing a signal indicative of the airspeed;

(c) determining the difference between a reference airspeed and the aircraft airspeed, and producing a signal indicative of the difference, wherein the difference between the reference airspeed and the aircraft airspeed is determined by the formula:

$$\text{difference} = V_{CAS} - V_{REF}$$

where:

$$V_{REF} = V_{CAS}[C_{LA}/(\eta + C_{LREF})]^{1/2}; \text{ and}$$

where:

$\eta$ = a normal load factor;

$C_{LA}$ = an actual lift coefficient at current airspeed $V_{CAS}$; and $C_{LREF}$ = a lift coefficient at reference airspeed, $V_{REF}$ determining an aircraft flap position and producing a signal indicative thereof;

(d) determining an alert threshold as a function of the signal indicative of airspeed difference and the signal indicative of aircraft flap position and independent of the wind shear magnitude so that the alert threshold is modified to compensate for changes in lift of the aircraft when its speed differs from the reference airspeed and is not affected by the wind shear magnitude; and (e) comparing the signal indicative of the wind shear magnitude to the alert threshold signal, and producing a wind shear alert if a predetermined one of said alert threshold signal and said signal indicative of wind shear magnitude is greater than the other of said signals, whereby when the alert threshold signal is modified as a function of the signal indicative of airspeed difference and the signal indicative of aircraft flap position, unjustified wind shear alerts are generally avoided, without an adverse impact on aircraft safety during the wind shear condition.

* * * * *

UNITED STATES PATENT AND TRADEMARK OFFICE
CERTIFICATE OF CORRECTION

PATENT NO. : 5,493,293
DATED : February 20, 1996
INVENTOR(S) : R. Hansel et al.

It is certified that error appears in the above-indentified patent and that said Letters Patent is hereby corrected as shown below:

| COLUMN | LINE | |
|---|---|---|
| 3 | 33 | "$W_x/g$," should read --$\dot{W}_x/g$-- |
| 3 | 37 | "$W_x/g$," should read --$\dot{W}_x/g$-- |
| 3 | 42 | "$W_x/g$," should read --$\dot{W}_x/g$-- |
| 3 | 46 | "$h_I$," should read --$\dot{h}_I$,-- |
| 3 | 62 | "$\theta$" should read --$\dot{\theta}$-- |
| 10 (Claim 4, line 21) | 25 | "$V_{REF}$" should read --$V_{REF}$,-- |

Signed and Sealed this

Twenty-fifth Day of June, 1996

Attest:

BRUCE LEHMAN

*Attesting Officer*      *Commissioner of Patents and Trademarks*